United States Patent Office 3,063,125
Patented Nov. 13, 1962

3,063,125
METHOD OF MAKING HEAT INSULATING MATERIAL FROM CATTAIL FIBERS
David A. Vincent, Wilton, Minn., assignor to Typha Products, Inc., Bemidji, Minn., a corporation of Minnesota
No Drawing. Filed Mar. 27, 1957, Ser. No. 648,796
2 Claims. (Cl. 28—72)

This invention relates to insulation, and more particularly to an insulation mat utilizing natural fiber material and a method for preparing such insulation mat.

I have found that ripe cattail heads may be usefully employed in fluffed or exfoliated condition and may be specially treated in such fluffed or exfoliated condition to produce an insulating mat. The cattail plant grows prolifically in swampy areas of most of the northern states and develops into tall reeds, the upper ends of which bear the seedlings and fibrous material extending radially outward in compacted relation from the stem of the plant. The cattail heads, after becoming ripe, gradually deteriorate and break up into clumps or aggregate of fibrous material which is torn from the head by the wind and may be blown for long distances. The cattail fiber has a natural water repelling quality which permits the fibrous clumps to float on open water for a considerable length of time. The floating property is one of nature's methods of distributing the attached seeds to a muddy shoreline where they lodge and eventually take root. Although the water repellant character of the cattail fibers is such as to discourage the use of the material in wetted form, I have found a procedure by which a useful heat insulating mat can easily be fabricated.

It is, therefore, an important object of this invention to provide a heat insulating mat comprising fibers of cattail heads specially treated to produce a coherent entity.

It is another object of the invention to provide a method by which the water repellant clumps of cattail fiber can be treated to make possible the production of the aforementioned heat insulating mat.

With the foregoing objects in mind, my mat and the method of making it is described herewith.

I first harvest the heads at a time when the fibers are about to become naturally loosened, generally in December when the swampy ground is frozen and capable of supporting harvesting equipment. The outer material of the heads is then removed from the remaining stem to produce a greatly increased volume of the separated material which includes clumps of the fibrous material, seeds and individual fibers. In the condition just mentioned, the material has a specific gravity considerably greater than that which it is capable of assuming. Furthermore, the entire fiber mass tends to float and the clumped material excludes water from the interior and thereby maintains air spaces which tend to float the clumps at the surface of water. A part of my procedure includes the step of loosening the fibers from the clumped material to the point where the individual fibers are substantially unattached to one another throughout their lengths but not completely separated one from the other. Complete separation of each individual fiber is virtually impossible and the loosening procedure has been found to suffice for my purpose. When the clumps are loosened, any foreign material present can be pulled from the cattail material and can be discarded.

The loosened material is then placed in water suspension and is agitated to the point where the fluffy water resistant material is submerged. The mixing is continued until the loosened clumps have finally become thoroughly wet throughout the individual fibers thereof and a slurry of suspended fiber is obtained. It is understood that substances increasing the wetting propensities of water may be added to the mix to speed up the formation of suspended fibers in slurry condition. Unless the fiber clumps are properly loosened, even the addition of wetting compounds will not make possible the slurrying of the fiber material in a short enough period of time to make the process commercially feasible. The loosening step is, therefore, quite important to the instant invention in that it makes possible the overcoming of the natural floating tendency of the cattail fiber as a preliminary treatment to the formation of my insulating mat.

After the fibers are wetted and slurried and are dispersed in random orientation throughout the liquid, the water is withdrawn as through a Fourdrinier screen or the like, and the fibers in their random dispersion interlace to form a firm and coherent mat, yet having a low density and high heat insulating quality.

Since my method adapts itself to mat-forming, I may employ any of a number of commercially available adhesive materials capable of dispersion or solution in the liquid component of the slurry. As the slurry containing adhesive is drawn through the mat a portion of the dispersed adhesive is retained throughout the mass of fibers in the mat. The amount of adhesive is, of course, not so great as to destroy the light density of the mat and is primarily present for toughening rather than hardening the mat structure.

It is, of course, understood that my invention is concerned with the treatment of normally water resistant cattail fibers to produce a slurry mass and is not limited to particular ratios of water or to particular apparatus for effecting the loosening or de-fibering step.

It is further understood that the withdrawal of water from the slurry may be effected by gravity or forced evacuation, the resulting mat in either case being a commercially acceptable article.

What I claim is:
1. A method of making a heat insulating mat from ripe cattail plant heads, consisting in removing and loosening clumped fiber material from the cattail heads, submerging and mixing the loosened fiber material in a water base slurry and thoroughly wetting the fiber material, adding a water dispersible adhesive material to the slurry, and withdrawing the fluid from the slurry to form a compact mass of randomly oriented cattail fibers, and retaining a portion of the dispersed adhesive throughout the mass of fibers.

2. A method of making a heat insulating mat from ripe cattail plant heads, consisting in removing and loosening clumped fiber material from the cattail heads, submerging and mixing the loosened fiber material in a water base slurry and thoroughly wetting the fiber material, dissolving adhesive material in said water base slurry, and withdrawing the dissolved adhesive not adhering to said fiber material to form an adhered mass of interlaced fiber material.

References Cited in the file of this patent
UNITED STATES PATENTS

| | | |
|---|---|---|
| 159,051 | Sweeney | Jan. 26, 1875 |
| 159,452 | Riker | Feb. 2, 1875 |
| 190,159 | Radcliffe | May 1, 1877 |
| 1,396,960 | Johnson | Nov. 15, 1921 |
| 1,602,253 | Runkel | Oct. 5, 1926 |
| 2,338,610 | Wiley | Jan. 4, 1944 |
| 2,360,416 | Gray | Oct. 17, 1944 |
| 2,593,373 | Weber | Apr. 15, 1952 |
| 2,794,238 | Dildilian et al. | June 4, 1957 |

FOREIGN PATENTS

| | | |
|---|---|---|
| 448,768 | Canada | May 25, 1948 |